US005165098A

United States Patent [19]

Hoivik

[11] Patent Number: 5,165,098
[45] Date of Patent: Nov. 17, 1992

[54] SYSTEM FOR PROTECTING DIGITAL EQUIPMENT AGAINST REMOTE ACCESS

[75] Inventor: Lars Høivik, Nesøya, Norway

[73] Assignee: System Sikkerhet A/S, Moland, Norway

[21] Appl. No.: 623,815

[22] Filed: Jan. 3, 1991

[30] Foreign Application Priority Data

Jul. 5, 1988 [NO] Norway ................................ 882982

[51] Int. Cl.[5] .......................... H04K 1/10; H04L 9/00
[52] U.S. Cl. ........................................... 380/8; 380/6; 380/49
[58] Field of Search .................... 380/3, 4, 6, 7, 8, 49, 380/50

[56] References Cited

U.S. PATENT DOCUMENTS

| | | | |
|---|---|---|---|
| 3,174,118 | 3/1965 | Moore | 380/6 X |
| 3,887,772 | 6/1975 | Miller | 380/8 |
| 4,208,545 | 6/1980 | Zenner | 380/8 |
| 4,563,546 | 1/1986 | Glitz | 380/49 |
| 4,932,057 | 6/1990 | Kolbert | 380/6 X |

FOREIGN PATENT DOCUMENTS 0240328 10/1987 European Pat. Off. .

*Primary Examiner*—Bernarr E. Gregory
*Attorney, Agent, or Firm*—Jacobson, Price, Holman & Stern

[57] ABSTRACT

System for protection against remote access to digital equipment (1) emitting stray electromagnetic radiation (2) and operating with digital signals under clock control and being based on the representation of a given set of characters, comprising means (18, 19) for emitting protective electromagnetic radiation covering the frequency spectrum of said stray radiation. A store (14) for a character set comprises at least some of the characters in said given set of characters, and means (13) are included for selecting characters in random order from the store (14). The selected characters are applied to drive means (15, 16, 18) which are adapted to generate digital signals corresponding to the selected characters and modulated in a manner corresponding to the digital signals of the equipment (1) so as to be of substantially the same nature as these. Drive means (15, 16, 18) are adapted to emit, preferably continuously, the generated digital signals to an antenna (19) for radiating corresponding protective electromagnetic radiation.

13 Claims, 2 Drawing Sheets

DIAGRAM OF THE PROTECTION MODULE

DIAGRAM OF THE PROTECTION MODULE

Figure 1:
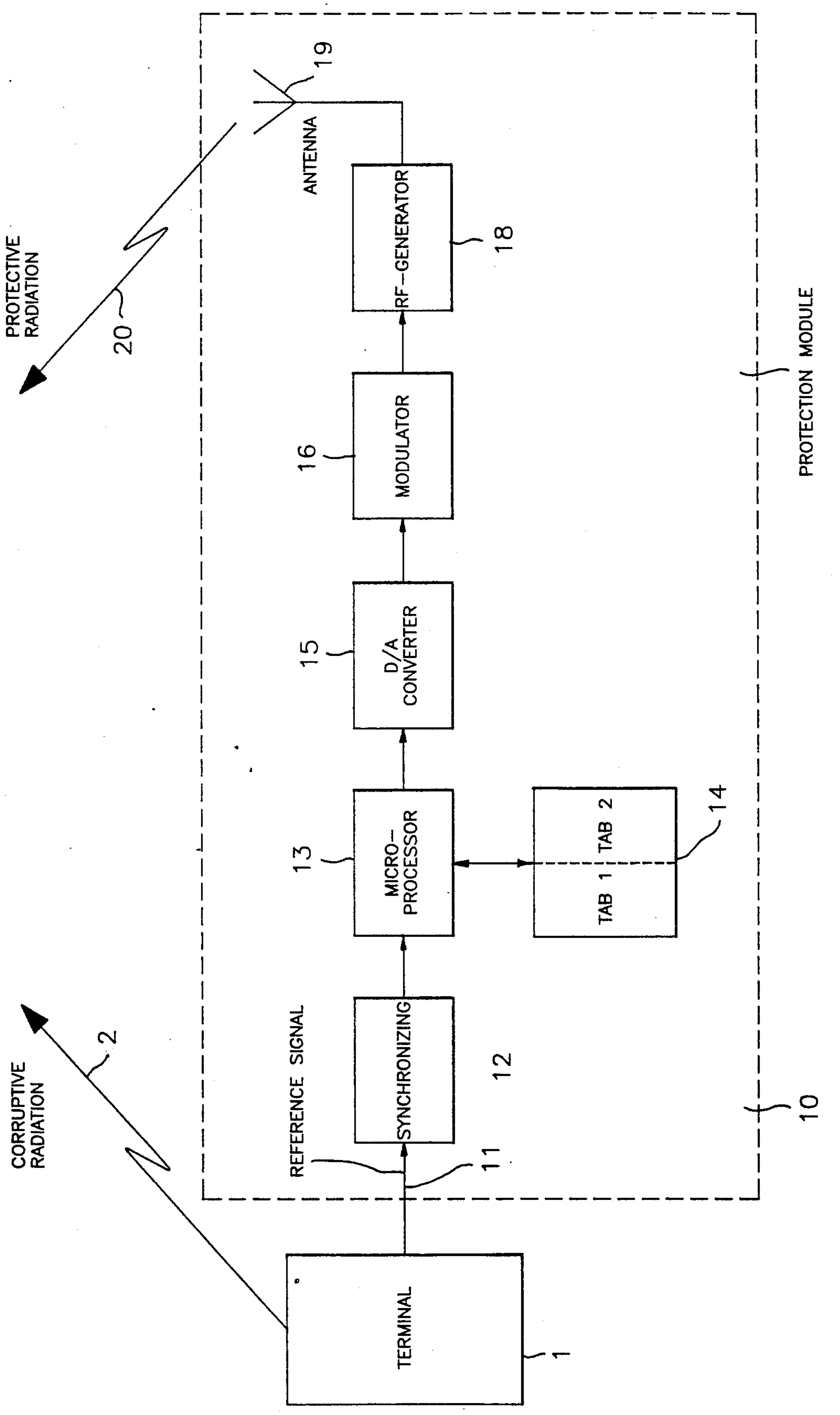

ILLUSTRATION OF HOW THE MASKING SIGNAL (2B) TOGETHER WITH THE CORRUPTIVE SIGNAL (2A) FORMS A TOTAL RADIATED SIGNAL

ILLUSTRATION OF THE TOTAL RADIATED SIGNAL AFTER AMPLITUDE MODULATION

SYSTEM FOR PROTECTING DIGITAL EQUIPMENT AGAINST REMOTE ACCESS

Data security is today in focus at the same time as EDP is being increasingly introduced into new fields of use. Often there may be large amounts of information collected in a single system. The information contained in an electronic data processing plant is usually protected by conventional methods such as security zones, code words and restricted access.

A potential source of leakage which has not attracted much attention, apart from defence applications, is electromagnetic radiation from peripheral equipment, for example terminals and printers. The only method employed today is screening, and such equipment is normally referred to as TEMPEST protected. There is today such equipment available on the market and this is accepted for defence use. A drawback is represented by the high expences connected with this protection. The price of most of the products is doubled thereby. Besides, there are a limited number of producers which supply such equipment. In recent times there have appeared new, interesting fields of use. Requirements for protection of individuals and economical values will lead to more strict demands with respect to security in all types of computer systems, against unauthorized access and corruptive stray radiation.

The problem of electromagnetic radiation from computer equipment is largest in peripheral equipment such as computer screens and printers. The reason for this is that in this type of equipment the information is presented in serial form. Data terminals which do not store the picture on the screen have a continuous updating of the screen picture. Usually this is repeated at a frequency of 25 Hz or more. Therefore it is possible by means of relatively simple detection equipment to pick up a radiated signal with an antenna and a receiver. The signal can then be reproduced by simple processing.

It is previously known that protection against remote detection of corruptive radiation can be obtained by emitting a masking signal in the form of white noise. In order to obtain the desired effect in this manner, it is necessary to have comparatively high power in the masking signal compared to the unintended radiation and corruptive information signal from the equipment concerned. Moreover there are a number of other problems related to such protection or masking, among other things because in part one operates in the near field of the source of radiation. It is then difficult and expensive to obtain a uniform omnidirectional radiated power. No simple antenna can do this, but on the other hand, it is to be remarked that nor does peripheral computer equipment constitute any omnidirectional source of radiation.

For protecting against leakage or corruption of information being printed by a matrix printer, it is known from German patent No. 2838.600 to employ a compensation signal generated in such a way that the sum of this compensation signal and the printing signal in the matrix printer, is constant. Accordingly the total emitted radiation from the equipment will be constant, which makes it difficult to detect the actual information signal. The compensation signal is generated by compensation units which electrically shall correspond to the separate circuits which serve to activate the individual needles in the printer mechanism. In addition to being rather complicated and cumbersome it is obvious that this known method is intimately related to the form of matrix printer concerned, so that the method among other things is not useful in connection with screen terminals.

Also European patent application No. 0.069.831 relates to a method for the purpose of avoiding corruptive radiation from data equipment. The solution described is to a large extent analogous to what is described in the above German patent specification. Both methods involve significant intervention into the equipment concerned, for which protection is desired, or even a completely integrated or built-in protective device in the computer equipment.

An object of the present invention is to obtain protection which can be provided comparatively easily in connection with existing data equipment at the same time as it can be integrated in a relatively simple and inexpensive manner into new equipment being produced. Moreover it is an object of the invention to provide a system which in a better and more flexible way affords protection against remote access to digital equipment which emits stray electromagnetic radiation.

Current types of such digital equipment operate with digital signals under clock control and are based on the representation of a given set of characters. From the above it has appeared that for masking or protection it is known to employ means for emitting protective electromagnetic radiation covering the frequency spectrum of said stray radiation.

In short this invention provides for the masking of corruptive radiation from computer equipment by emitting a coded masking signal which together with the actual information-carrying and corruptive signal will form a modified corruptive signal which to a high degree makes it difficult to detect or remotely access the information.

When the masking signal has the same or similar characteristic properties as the unintentionally radiated signal, there is obtained a good protective effect. In this connection it is an important feature that the masking comprises emission of a series of random character and letter combinations selected from a set of characters being equal to or corresponding to at least a portion of the character set which is given and is used for information processing and presentations in the data equipment concerned, and which can have the same statistical properties as the corruptive signal.

Figure 2A:
Figure 2B:
Figure 2C:
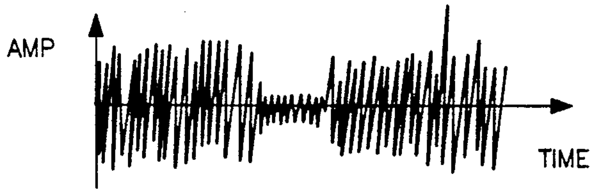
Figure 3:
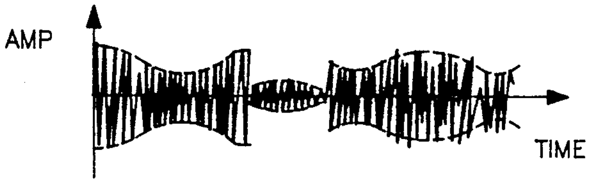

Statements defining the system according to the invention as well as the novel and specific features thereof, are found in the claims. In the following description the invention will be explained more closely with reference to the drawings, in which:

FIG. 1 shows a simplified block diagram of a protection system according to the invention, FIG. 2, parts A, B, and C, shows examples of typical signal shapes with protection by means of a system according to FIG. 1, and FIG. 3 illustrates signal shapes with an additional and advantageous amplitude modulation according to an embodiment of the invention.

In FIG. 1 there is shown a digital unit or data equipment unit in the form of a terminal 1 and an associated system for protection against corruptive radiation from the terminal 1, in the form of a module generally denoted 10. The radiation from the terminal 1 is indicated at 2.

The terminal 1 emits corruptive radiation 2 of a relatively broadband nature, from 50 Hz to several MHz.

Since the signal propagation in the terminal is essentially synchronous the corruptive radiation from the various components will also be synchronous. Further the radiation is primarily radiated from the electronic circuits which generate characters on the screen.

The protection module 10 shown, comprises as main components a micro-processor 13 and a store 14 containing one or two tables to be described more closely below. In the module 10 there is further included a digital-analog converter 15, a modulator 16 and a high frequency generator 18 which emits protective or masking radiation through an antenna 19. The units or circuits 15, 16 and 18 can be considered to constitute the drive means for digital signals to be radiated from the antenna 19. In the module 10 there is additionally provided a synchronizing unit 12 which through a connection 11 is adapted to receive a reference signal from the terminal 1, and which on the other hand supplies a clock signal to the micro-processor 13.

Accordingly synchronism of the protective signal is secured thereby that the module 10 is controlled by the reference clock signal taken from the terminal 1. In the synchronizing unit 12 this signal is converted to the clock signal in the protection module. In order to adjust the phases of the protective and the corruptive radiation, the clock signal can be phase-shifted so that both signals are in phase.

The protection module is built up around the micro-processor 13 which quite at random selects which character the protective signal shall represent, modulates the signal and administrates the emission of the protective radiation 20.

In order that the protective radiation 20 shall have an optimal effect, the signature of all characters which can be presented by the terminal 1 on its screen, are stored in a register, i.e. the store 14 in the form of the so-called character table I containing codes for the choice of characters concerned. The processor 13 will then read out one of these codes when a protective signal is to be emitted.

The most important property of the protective signal, in addition to being analagous or identical in nature to the corruptive radiation, is that the characters emitted are selected in a completely random order or have a statistical distribution of characters corresponding to the radiated signal. This is obtained thereby that the micro-processor 13 in its programme table has stored an algorithm which generates a random sequence, which can take place in a manner which is known per se. If it is desired to avoid the repetition of the same sequence each time the equipment is started up, there can be utilized a circuit for generating a statistically random starting point.

In addition to the character generator or table I there is also included a second table II for generating (modulating) the strength of the signal emitted. In order to obtain the best protection it is desirable that the masking signal be amplitude modulated. This is done by entering into the second table II and reading out the signal strength of the character to be emitted. This is sensed by the micro-processor 13 and when this information has been associated with the selected character, the micro-processor is ready to emit the protective signal.

The signal is supplied in a digital form to the digital-analog converter 15 which generates a modulation signal. The modulator 16 serves to have the signal from the RF generator 18 amplitude modulated and emitted from the antenna 19. The RF generator 18 can be a small solid-state source with tuned output power adjusted to the radiation of the terminal.

The protective signal 20 is radiated for example from an omnidirectional antenna 19 integrated into the protection module 10. Thus the output power is matched to the radiation level of the corruptive radiation from the terminal 1.

FIG. 2 shows signal shapes as a function of time for illustrating the manner of operation of a system as shown in FIG. 1. The amplitudes AMP are shown in arbitrary units. The modulation of the signal reflects the binary character levels. More closely there is shown at 2A an example of an unintentionally radiated high frequency signal from data equipment such as the terminal 1 in FIG. 1, whereas at 2B there is illustrated a typical masking signal included in the protective radiation 20 from the module 10. This masking signal contains random character combinations which together with the signal mentioned above, results in a total radiated signal as shown at 2C. In this total signal the two signals mentioned above are combined in such a manner that even the most advanced remote detection equipment will hardly be able to detect the actual information for which protection is desired.

It will be realized that if the masking signal is too weak, the effect thereof may be suppressed, which means that the masking signal must have a certain minimum strength. Further it will be realized that a stable masking signal having a constant strength or amplitude, may involve uncertainty with respect to the effect of the masking and thereby the protection. Therefore according to the invention it has been found to be an advantage to modulate the masking signal as illustrated in FIG. 3. The superimposed amplitude modulation gives a further improved protection by the system.

In any detection process the sorting out and suppression of irrelevant information is a problem. In order to additionally improve the protective effect when using the system according to the invention, the masking signal can be emitted continuously when the digital equipment, possibly data equipment, is turned on. Even though such equipment is not in operation a continuous stream of randomly selected masking signals will bring any remote detection system to saturation, and thereby more or less make it impossible to detect the information for which protection is desired. With such utilization of this system there will be obtained a mutual protection when several different data equipment units in the same premises or location are provided with systems according to the invention. In many cases there will then be need for only a couple of masking systems in order to protect several data plants or units, even though these are not operating synchronously.

I claim:

1. System for security protection of digital equipment (1) emitting spray electromagnetic radiation (2) and operating with modulated digital signals under clock control and being based on the representation of a given set of characters, comprising means (18, 19) for emitting protective electromagnetic radiation covering the frequency spectrum of said stray radiation, characterized by a store (14) for a character set comprising at least some of the characters in said given set of characters, means (13) for selecting characters in random order from the store (14), drive means (15, 16, 18) to which the selected characters are applied and which drive means is adapted to generate digital signals corresponding to the selected characters, said generated digital signals being modulated in a manner corresponding to the modulation of the digital signals of the equipment (1), said generated digital signals being substantially synchronized (12) with the digital signals of the equipment (1), and the drive means (15, 16, 18) is adapted to deliver one of continuously and intermittently generated digital signals to an antenna (19) for emitting said protective electromagnetic radiation.

2. System according to claim 1, characterized in that said synchronizing (12) comprises the phase of the digital signals.

3. System according to claim 1, characterized in that the drive means (15, 16, 18) are adapted to give the generated digital signals an amplitude modulation (16) in addition to said modulation in a manner corresponding to the digital signals of the equipment (1).

4. System according to claim 1, characterized in that said synchronizing (12) comprises the phase of the digital signals.

5. System according to claim 1, characterized in that the means (18, 19) for emitting the protective electromagnetic radiation are adapted to operate within a limited frequency band which overlaps the frequency spectrum of said stray radiation.

6. System according to claim 1, characterized in that the drive means (15, 16, 18) have a coupling (11, 12, 13) to the clock control of the equipment (1).

7. System according to claim 6, characterized in that said synchronizing (12) comprises the phase of the digital signals.

8. System according to claim 6, characterized in that the means (18, 19) for emitting the protective electromagnetic radiation are adapted to operate within a limited frequency band which overlaps the frequency spectrum of said stray radiation.

9. System according to claim 8, characterized in that the means (18, 19) for emitting the protective electromagnetic radiation are adapted to operate within a limited frequency band which overlaps the frequency spectrum of said stray radiation.

10. System according to claim 8, characterized in that the drive means (15, 16, 18) are adapted to give the generated digital signals an amplitude modulation (16) in addition to said modulation in a manner corresponding to the digital signals of the equipment (1).

11. System according to claim 6, characterized in that the drive means (15, 16, 18) are adapted to give the generated digital signals an amplitude modulation (16) in addition to said modulation in a manner corresponding to the digital signals of the equipment (1).

12. System according to claim 11, characterized in that the drive means (15, 16, 18) are adapted to give the generated digital signals on amplitude modulation (16) in addition to said modulation in a manner corresponding to the digital signals of the equipment (1).

13. System according to claim 1, characterized in that the means (18, 19) for emitting the protective electromagnetic radiation are adapted to operate within a limited frequency band which overlaps the frequency spectrum of said stray radiation.

* * * * *